Jan. 1, 1929.  1,697,067
F. S. JONES
METAL CUTTING MACHINE
Filed Feb. 13, 1923   7 Sheets-Sheet 7

Inventor
Frank S. Jones.
By Joshua R. H. Potts
His Attorney

Patented Jan. 1, 1929.

1,697,067

UNITED STATES PATENT OFFICE.

FRANK S. JONES, OF PHILADELPHIA, PENNSYLVANIA.

METAL-CUTTING MACHINE.

Application filed February 13, 1923. Serial No. 618,789.

My invention relates to metal cutting machines of the slotter and shaper type and has for its object to provide a machine which will facilitate the working of metals and increase the speed and accuracy of operation.

This object, and other advantageous ends which will be described hereinafter, I attain in the following manner, reference being had to the accompanying drawings in which—

Figure 1 is a front elevation of a machine constructed in accordance with my invention, Figure 2 a side elevation of Figure 1, Figure 3 a rear elevation of Figure 1, Figure 4 a sectional plan view taken on line 4—4 of Figure 2, Figure 5 an enlarged vertical section taken substantially on line 5—5 of Figure 2, Figure 6 a central sectional elevation taken on line 6—6 of Figure 1, Figure 7 an enlarged fragmentary section taken on line 7—7 of Figure 4, Figure 8 an enlarged fragmentary section taken on line 8—8 of Figure 5, Figure 9 a section taken on line 9—9 of Figure 2, Figure 10 an enlarged section taken on line 10—10 of Figure 1, Figure 11 an elevation partly in section looking in the direction of arrow $x$ of Figure 10, Figure 12 an enlarged section taken on line 12—12 of Figure 1, and Figure 13 a section taken on line 13—13 of Figure 3.

Figures 1, 12:
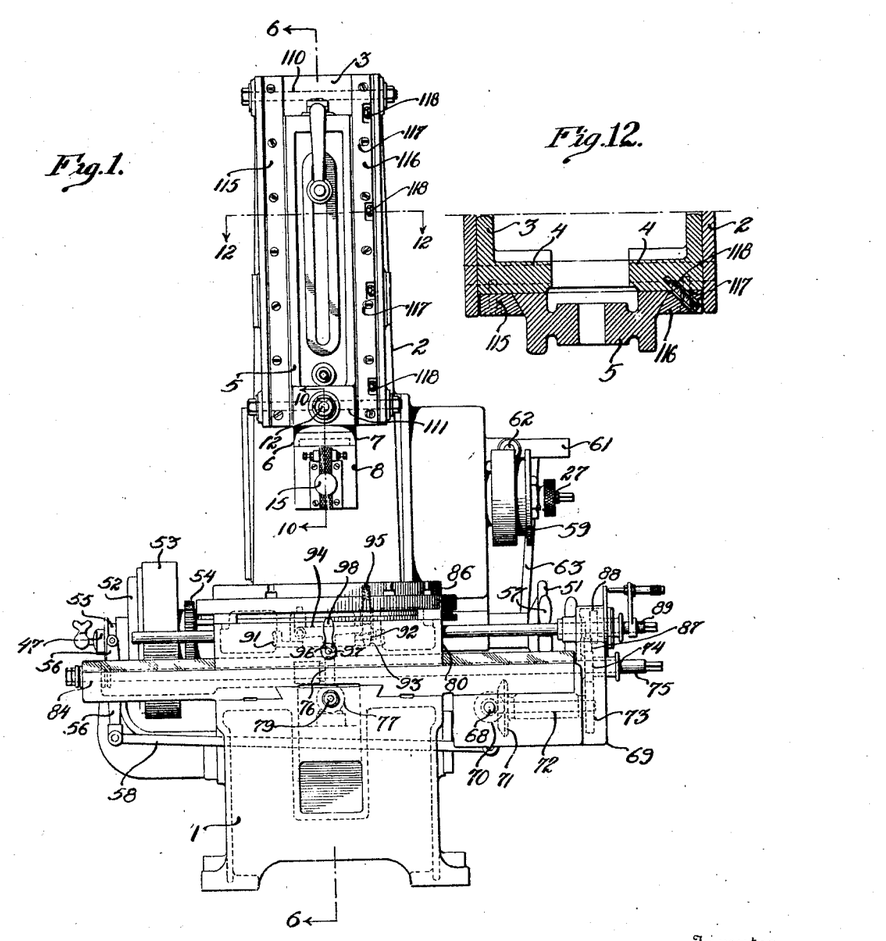
Figure 2:
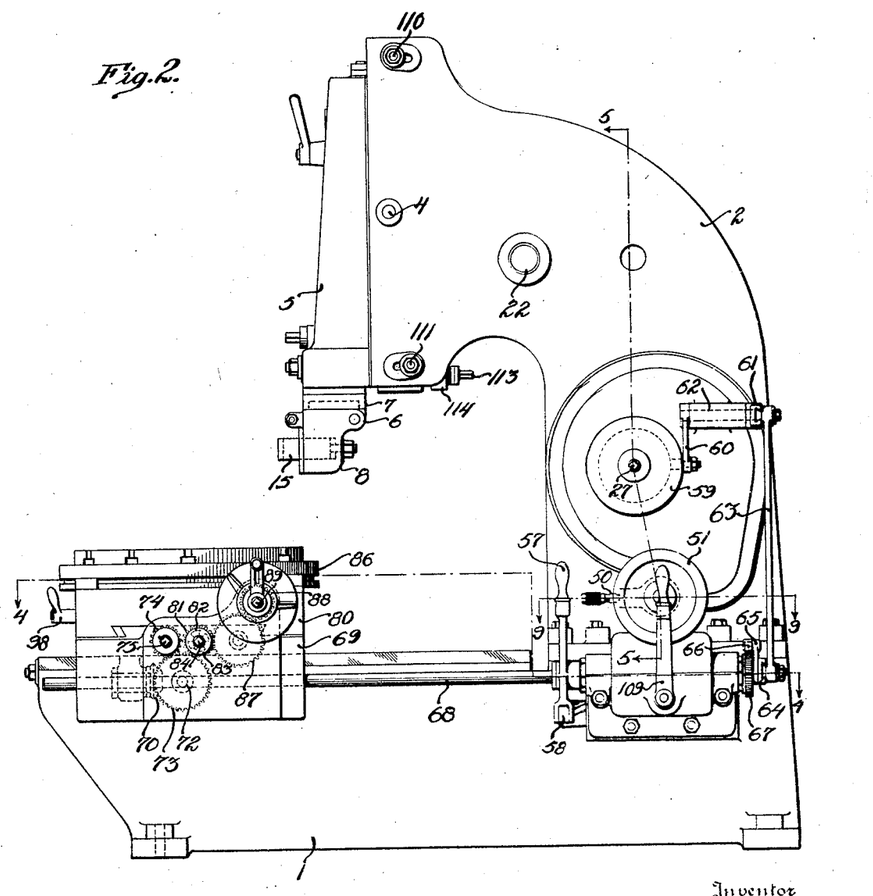
Figures 3, 13:
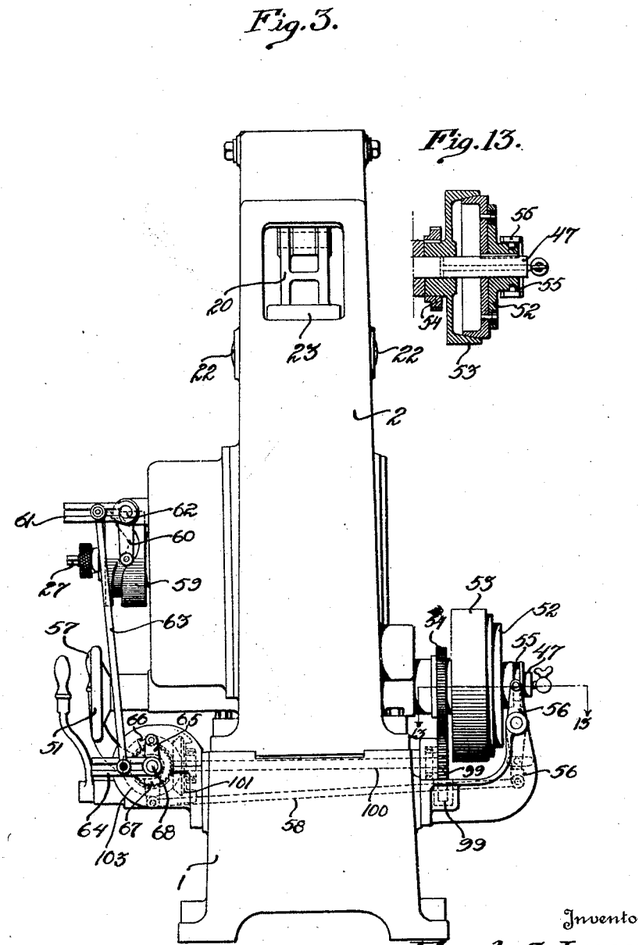
Figure 4:
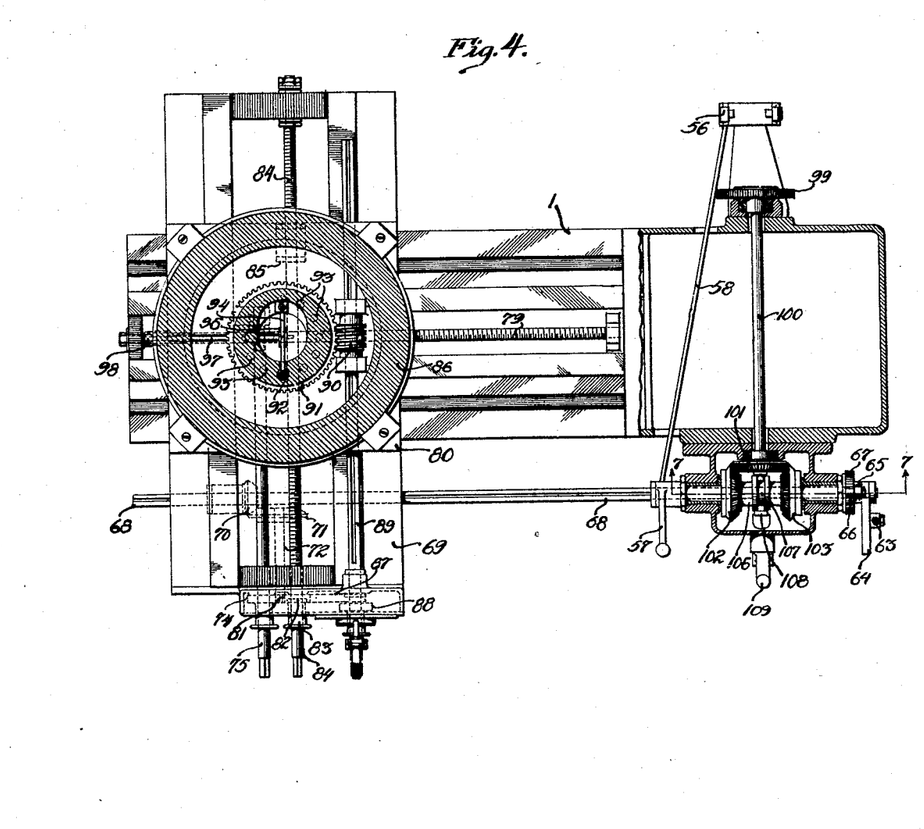
Figure 5:
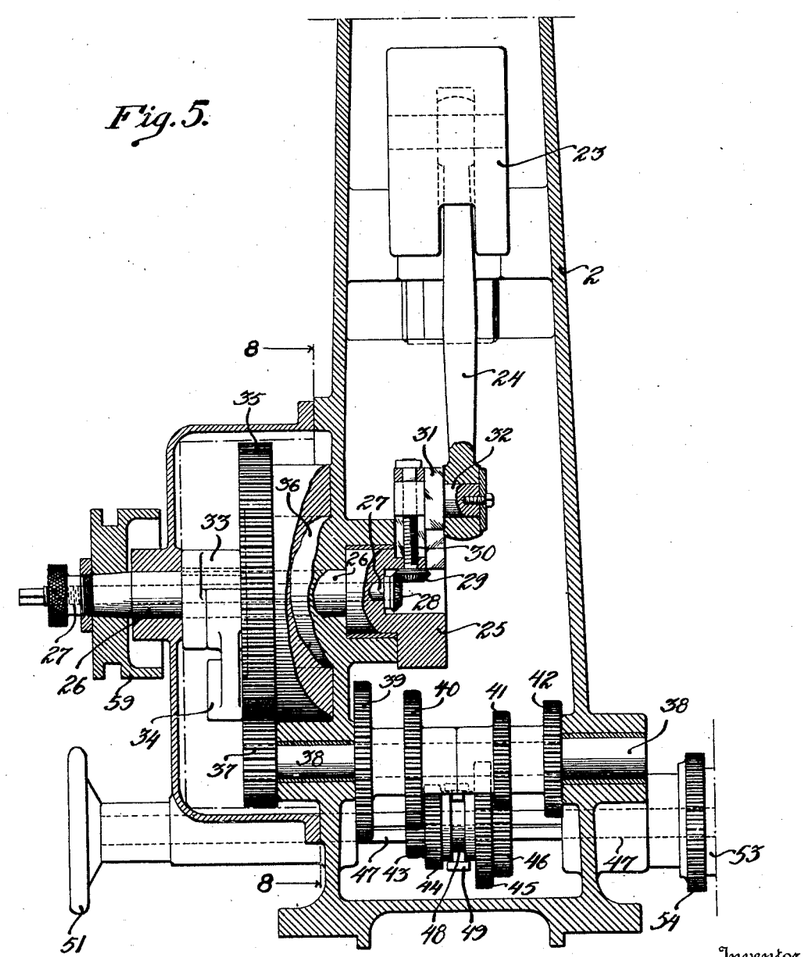
Figure 6:
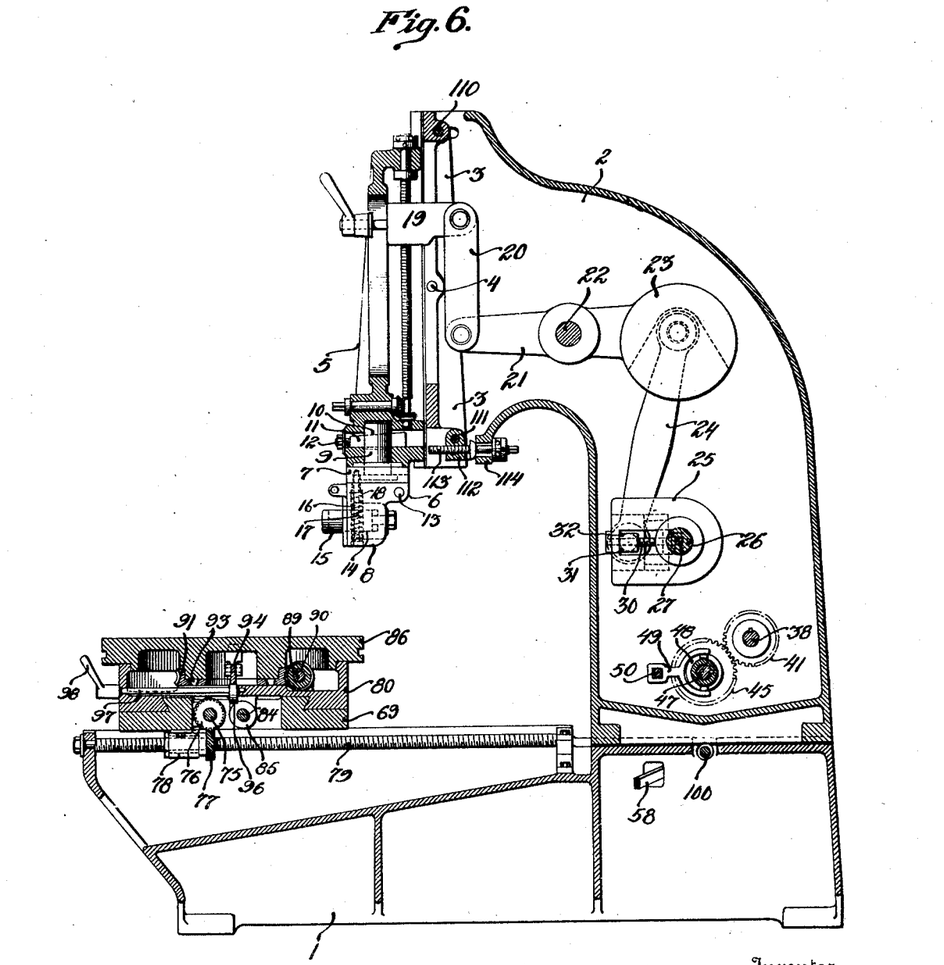
Figures 7, 8, 9, 10, 11:
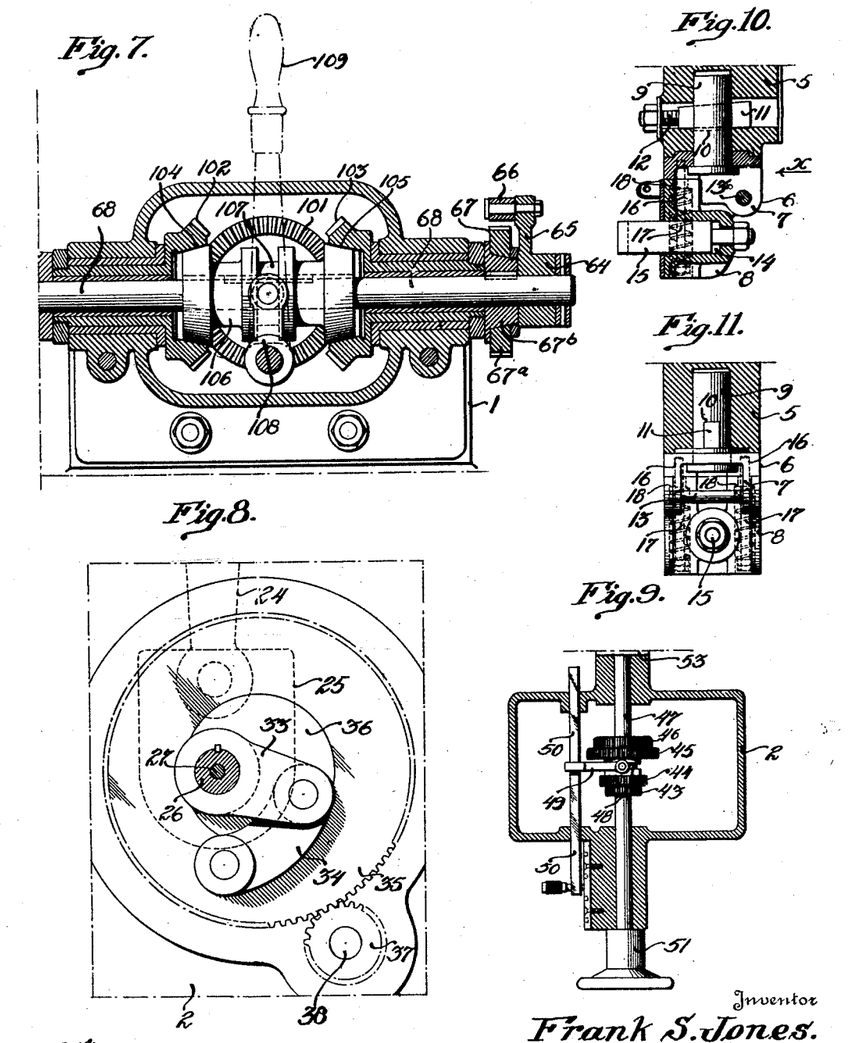

Referring to the drawings, 1 is a bed; 2 a column mounted on the bed; 3 a guide pivoted on the column by a pivot 4 substantially midway between its ends; 5 a ram mounted to slide in guide 3 and having at its lower end a clapper box 6 made of two sections 7 and 8. Section 7 is held in place by a pin 9 having a tapered slot 10 adapted to receive a wedge 11 having a threaded end 12 with a nut thereon to tighten the wedge in the tapered slot and thereby rigidly hold section 7 in position. Section 8 is pivoted at 13 to section 7, and has an aperture 14 to receive a tool holder 15 having a tool slot at one end and threaded at the other end to receive a nut adapted to tighten the tool holder 15 and hold the tool in place. Secured to section 7 are stud bolts 16, having adjusting nuts at their lower ends. Compression springs 17, abut shoulders 18 and the adjusting nuts, thereby keeping the tool in cutting position and permitting a backward movement thereof on the up stroke of the ram, thus preventing dragging and consequent wearing of the tool.

Ram 5 has adjustably secured thereto a block 19 connected by a link 20 to one end of a balance arm 21 pivoted in the column at 22. A balance weight 23 on the other end of the balance arm is connected by a rod 24 to an adjustable crank 25 fixed to a hollow shaft 26. An adjustable shaft 27 passes through the hollow shaft and has on one end a beveled gear 28 meshing with a beveled gear 29 on an adjusting screw 30 passing through an adjusting block 31 having a crank pin 32 thereon. Block 31 slides in a dovetail groove. Adjusting shaft 27 is threaded near the other end to receive a locking nut to lock the crank pin in an adjusted position. An angular end is provided on the adjusting shaft to receive a hand crank when making an adjustment.

Variable speed mechanism connected to hollow shaft 26 comprises an arm 33 fixed on the shaft and connected by a link 34 to a bull gear 35 rotatably mounted on an annular projection 36 cast integrally with the column. A pinion 37 meshing with bull gear 35 is mounted on a shaft 38 having its bearings near the bottom of the column and carrying change gears 39, 40, 41 and 42. Shifting gears 43, 44, 45 and 46 fixed to each other are slidably keyed to drive shaft 47 mounted in bearings in the column and have an annular groove 48 in their hub adapted to receive a yoke 49 fixed to a square shifting rod 50 sliding in bearings in the column. Shifting rod 50 has a handle with a spring-pressed pin therein adapted to register with finder holes to hold the shifting gears in meshing position. A hand wheel 51 is secured on one end of the drive shaft. The other end has a slidably keyed clutch member 52 and a rotatably mounted driving clutch member 53 having a gear 54 fixed thereto. Clutch member 52 has an annular groove 55 adapted to receive a yoke 56 connected to a lever 57 by a rod 58 passing through the bed.

The intermittent feed mechanism comprises a cam 59, secured to hollow shaft 26, and having a groove adapted to receive the end of an arm 60 fixed to a slide 61 by a stud 62. A rod 63 has a block at one end adapted to slide in a dovetail groove in the slide 61. The other end of rod 63 has a similar block sliding in a dovetail groove in a slide 64 fixed to an arm 65 having a pawl 66 thereon adapted to engage a friction ratchet wheel 67 keyed to saddle feed shaft 68. Slide 64 is rotatably mounted on shaft 68. Friction ratchet wheel 67 comprises two parts 67ᵃ and 67ᵇ held together by a nut causing frictional engagement of their conical surfaces.

A saddle 69, which slides on guideways in bed 1, receives its longitudinal movement from saddle feed shaft 68 through a slidably keyed bevel gear 70 meshing with a bevel gear 71 fixed to a shaft 72 having a gear 73 keyed thereto. Meshing with gear 73 is a spur gear 74 slidably keyed to a shaft 75 having a spiral gear 76 meshing with a spiral gear 77, fixed to a nut 78 rotatably mounted in bearings fixed to the saddle and adapted to receive a saddle feed screw 79 fixed to the bed.

A cross feed block 80 slides on guideways on the saddle transversely to the movement of the saddle. It receives movement through a gear 81 having a clutch face 82 adapted to receive a clutch member 83 slidably keyed to a cross feed screw 84 passing through a nut 85 fixed to the cross feed block. The cross feed screw is rotatably mounted in the saddle.

A table 86 which rotates on the cross feed block, receives its movement from the rotatably mounted gear 81 through an idler gear 87 meshing with a gear 88 slidably keyed to a shaft 89 having slidably keyed thereto a worm 90 meshing with a worm wheel 91 keyed to the rotary table by a spring-pressed plunger 92.

Worm wheel 91 is provided with holes 93, for quick indexing purposes, which are adapted to receive plunger 92 actuated by a latch 94, against the action of a spring 95, through the medium of a cam 96 on a shaft 97 having a handle 98 outside of the cross feed block.

The quick traverse mechanism comprises a gear 99, which meshes with gear 54 on the driving clutch member, and is fixed to one end of a shaft 100 mounted on the bed and by-passing the feed change gears. A bevel gear 101 fixed on the other end of shaft 100, meshes with a bevel gear 102 and a reversing gear 103 having clutch faces 104 and 105 adapt to receive a clutch member 106 slidably keyed to saddle feed shaft 68. Clutch member 106 has an annular groove 107 adapted to receive the ends of a yoke 108 fixed to a handle 109 by a stud. Bevel gears 102 and 103 are rotatably mounted in bearings fixed to the bed and rotate on shaft 68. Gear 99 and bevel gear 101 are mounted in ball bearings.

The guide holding means comprises pivot 4, and securing bolts 110 and 111 which pass through the guide and slots in the column. The guide is adjusted by a nut 112 swiveled to bolt 111 and receiving a screw 113 mounted against endwise movement in a bearing 114 on the column.

Guide plates 115 and 116 are held by screws on guide 3 to form a dovetail groove in which the ram slides. Guide plate 116 is provided with oblong screw holes 117 and adjusting screws 118 for the purpose of adjusting the dovetail groove to a close fit for the ram. The adjusting screws are arranged at an angle to guide plate 116 and have their holes therein elongated to allow for adjustment.

Assuming driving clutch member 53 to be driven by a belt, if it is desired to start the machine, clutch member 52 is actuated by lever 56 to engage clutch member 53, the power will be transmitted to shaft 47, either shifting gear 43, 44, 45 or 46 to the respective change gears 39, 40, 41 and 42 to shaft 38, pinion 37, bull gear 46, link 34, arm 33, hollow shaft 26, adjustable crank 25, connecting rod 24, balance arm 21, link 20, and block 19 to the ram.

The saddle, cross feed block and rotary table receive their movement through the intermittent feed mechanism from hollow shaft 26 through cam 59, arm 60, slide 61, link 63, slide 64, arm 65, pawl 66, friction ratchet wheel 67 to saddle feed shaft 68. If for any reason the saddle, cross feed block or rotary table should become locked, friction ratchet wheel 67 acts as a safety device due to the frictional connection to the shaft 68, when receiving its movement from the cam 59.

If it is desired to move the saddle longitudinally, the slidably keyed gear 74 is moved into mesh with gear 73 and the power will be transmitted from saddle feed shaft 68 through bevel gears 70 and 71, shaft 72, gears 73 and 74, shaft 75, spiral gears 76 and 77, to nut 78 which travels on screw 79 and causes the saddle to move.

If it is desired to move the cross feed block, the slidably keyed clutch member 83 is moved into engagement with clutch face 82 on gear 81. The power is then transmitted from gears 73 to gear 81, clutch member 83, cross feed screw 84 to nut 85 which is fixed to the cross feed block. If it is desired to rotate the table, slidably keyed gear 88 is moved into mesh with gear 87. The power will be transmitted from gear 87 through gear 88, splined shaft 89, worm 90, worm wheel 91 to rotary table 86.

To manually move either the saddle, cross feed block or rotary table; the slidably keyed gears 88 and 74, and clutch member 83 are moved out of engagement with the gears 87 and 73, and clutch face 82. A crank handle is placed on the square end of either shaft 89, cross feed screw 84 or shaft 75 and a manual movement of the rotary table, cross feed block or saddle is thus effected.

To impart a quick traversing movement to the rotary table, cross feed block or saddle, lever 56 is actuated to disengage clutch member 52 and stop the machine. Clutching member 106 is actuated by lever 109 to move into engagement with clutch face 104 on bevel gear 102. A quick movement will be imparted from driving clutch member 53 through gears 54 and 99, shaft 100, and bevel gear 101, to bevel gear 102.

To get a reverse movement, clutching member 106 is moved into engagement with clutch face 105 on bevel gear 103. A reverse movement is imparted to shaft 68 due to the reverse movement of bevel gear 103 and disengagement of clutch member 106 from clutch face 104.

When working metals such as gears or polygonal shapes, the quick indexing mechanism permits quick and accurate turning of the table to equally spaced points for cutting the metal. When it is desired to quickly index the rotary table, spring-pressed plunger 92 is moved out of engagement with worm wheel 91 by latch 94 actuated by handle 98; the table is turned until the plunger registers with the next hole. Handle 98 is then turned to release the latch and cause the spring-pressed plunger to enter the hole, thus locking the table in position. The rotary table may be indexed and locked to any part of a circle by providing the desired number of holes.

To change the speed of the machine, shifting gears 43, 44, 45 and 46 are actuated by handle on shifting rod 50 to move into engagement with their respective gear 39, 40, 41 or 42.

To vary the stroke of the ram by adjusting crank pin 32 on crank 25, the locking nut is unscrewed and adjusting shaft 26 is turned to move the crank pin toward or away from the center of crank to the desired position. Locking nut is then screwed tight to lock the crank pin in the adjusted position.

To adjust the guide, bolts 110 and 111 are loosened. Adjusting screw 113 is turned until the guide is in the desired position and the locking nuts are tightened again. An angular adjustment of the ram is thus made.

Should the ram wear the guide plates to a loose fit, the guide plate 116 may be adjusted by loosening the securing screws and turning the adjusting screw 118 until a close fit results. The securing screws are again tightened and an accurate stroking of the ram is effected.

When it is desired to change the angular position of the tool with respect to the work, the wedge 11 is loosened to permit the turning of clapper box 6 to the desired position. The wedge is tightened again to rigidly hold the clapper box in position. An angular adjustment of the tool is thus effected.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A metal cutting machine comprising a bed; a column on the bed; a pivoted guide in the column; a ram slidable in the guide; a balance arm connected to the ram; a balance weight on the balance arm; an adjustable crank connected to the balance weight; mechanism for imparting a variable speed to the crank in each revolution; speed change gears operatively connected thereto, and means for rotating the speed change gears.

2. A metal cutting machine comprising a bed; a column on the bed; a pivoted guide adjustably mounted on the column; a ram slidable in the guide; a balance arm connected to the ram; a balance weight on the balance arm; an adjustable crank connected to the balance weight; speed change gears mounted adjacent the bottom of the column and operatively connected to the crank, and means for rotating the speed change gears.

3. A metal cutting machine comprising a bed; a saddle on the bed; a column on the bed; a pivoted guide adjustably mounted on the column; a ram slidable in the guide; a balance arm connected to the ram; a balance weight on the balance arm; an adjustable crank connected to the balance weight; a hollow shaft fixed to the crank; means operatively connected to the hollow shaft and saddle for imparting an intermittent movement to the saddle; speed change gears operatively connected to the hollow shaft; driving means for rotating the speed change gears at will of operator; quick traversing mechanism geared to the driving means, and reversing means operatively connected to the quick traverse mechanism and saddle.

4. A metal cutting machine comprising a bed; a saddle on the bed; a column on the bed; a pivoted guide adjustably mounted on the column; a ram slidable in the guide; a balance arm connected to the ram; a balance weight on the balance arm; an adjustable crank connected to the blance weight; a hollow shaft fixed to the crank; a feed shaft operatively connected to the saddle; a friction ratchet fixed on the feed shaft; means for imparting an intermittent movement to the ratchet wheel; speed change gears operatively connected to the hollow shaft; driving means for rotating the speed change gears at will of operator; quick traversing mechanism geared to the driving means, and reversing means operatively connected to the quick traverse mechanism and feed shaft.

5. A metal cutting machine comprising a bed; a saddle on the bed; a column on the bed; a pivoted guide adjustably mounted on the column; a ram slidable in the guide; a balance arm connected to the ram; a balance weight on the balance arm; an adjustable crank connected to the balance weight; a hollow shaft fixed to the crank; a feed shaft operatively connected to the saddle; a friction ratchet fixed on the feed shaft; means for imparting an intermittent movement to the ratchet wheel; mechanism for imparting a variable speed to the crank in each revolution; speed change gears operatively connected to the mechanism; driving means for rotating the speed change gears at will of operator; quick traversing mechanism geared to the driving means, and reversing means operatively connected to the quick traverse mechanism and feed shaft.

6. A metal cutting machine comprising a bed; a saddle; a column; driving means on the column; quick traverse means operatively connected with the driving means, and reversing means operatively connected with the quick traverse means and saddle.

7. A metal cutting machine comprising a bed; a saddle; a column; driving means on the column; a quick traverse shaft passing through the bed and operatively connected with the driving means, and reversing means operatively connected with the quick traverse shaft and saddle.

8. A metal cutting machine comprising a bed; a saddle; a column; driving means adjacent the bottom of the column; quick traverse means operatively connected to the driving means, and reversing means operatively connected to the quick traverse mechanism and saddle.

9. A metal cutting machine comprising a bed; a saddle; a column; driving means adjacent the bottom of the column; a quick traverse shaft passing through the bed and geared to the driving means, and reversing means geared to the quick traverse shaft and saddle.

10. In a metal working machine, the combination with a cross feed block and driving means therefor, of a table rotatably mounted on the cross feed block, and means for connecting and disconnecting the table from the driving means at the will of the operator thereby permitting manual rotation of the table.

11. In a metal working machine, the combination with a cross feed block and driving means therefor, of a table rotatably mounted on the cross feed block, and a plunger for connecting and disconnecting the table from the driving means at the will of the operator, thereby permitting manual rotation of the table.

12. In a metal working machine, the combination with a cross feed block and driving means therefor, of a table rotatably mounted on the cross feed block, and a spring-pressed plunger for connecting and disconnecting the table from the driving means at the will of the operator, thereby permitting manual rotation of the table.

13. In a metal working machine, the combination with a cross feed block and driving means therefor, of a table rotatably mounted on the cross feed block; a spring-pressed plunger mounted in the table, and means for moving the plunger for connecting and disconnecting the table from the driving means at the will of the operator, thereby permitting manual rotation of the table.

14. In a metal working machine, the combination with a cross feed block and driving means therefor, of a table rotatably mounted on the cross feed block; a spring-pressed plunger mounted in the table; a latch for moving the plunger, and means for moving the latch at the will of the operator to connect and disconnect the table from the driving means, thereby permitting manual rotation of the table.

15. In a metal working machine, the combination with a cross feed block and driving means therefor, of a table rotatably mounted on the cross feed block; a spring-pressed plunger mounted in the table; a latch for moving the plunger; a cam for moving the latch, and means for moving the cam at the will of the operator to connect and disconnect the table from the driving means, thereby permitting manual rotation of the table.

16. In a metal working machine, the combination with a cross feed block and driving means therefor, of a table rotatably mounted on the cross feed block; a spring-pressed plunger mounted in the table; a latch for moving the plunger; a cam for moving the latch, and a handle connected to the cam to connect and disconnect the table from the driving means thereby permitting manual rotation of the table.

17. In a metal cutting machine, the combination with a ram, of a clapper box; a pin for holding the clapper box to the ram; a wedge for tightening the pin to hold the clapper box in position, and means for tightening the wedge.

18. In a metal cutting machine, the combination with a ram, of a clapper box; a pin for holding the clapper box to the ram; a wedge for tightening the pin to hold the clapper box in position; a threaded end on the wedge, and a nut on the threaded end for tightening the wedge.

19. In a metal cutting machine, the combination of a ram; a slotted pin in the ram; a clapper box rotatably mounted on the pin; a wedge passing through the slot in the pin; a threaded end on the wedge, and a nut on the threaded end for tightening the wedge and holding the clapper box in position.

20. In a metal cutting machine, the combination of a ram; a clapper box consisting of pivotally connected sections; means for holding one section to the ram; a tool holder on the other section, and resilient means on the opposite sides of the tool holder for holding one section against the other.

21. In a metal cutting machine, the combination of a ram; a clapper box consisting of pivotally connected sections; means for holding one section to the ram; a tool holder in the other section, and springs on opposite sides of the tool holder for holding one section against the other.

22. In a metal cutting machine, the combination of a ram; a clapper box, consisting of pivotally connected sections; means for holding one section to the ram; a tool holder in the other section; springs on opposite sides of the tool holder, and means for holding the spring under compression to keep one section against the other.

23. In a metal cutting machine, the combination of a guide; a guide plate; an adjustable guide plate having elongated holes; securing screws taking through the holes, and adjusting screws taking through the holes and disposed at an angle to the securing screws.

24. In a metal cutting machine, the combination with a guide; an adjustable guide plate having two series of elongated holes, one series being at an angle to the other series; securing means taking through one series of holes, and adjusting means taking through the other series of holes and disposed at an angle to the securing means.

25. A metal cutting machine comprising a bed; a column carried thereby; a guide pivotally mounted upon the column; a ram slidable in the guide; securing bolts adjacent the top and bottom of the guide, passing through the guide and through slots in the column; a nut swiveled to the lower securing bolt, and an adjusting screw mounted in a bearing in the column, secured against endwise movement and taking through the swiveled nut.

26. A metal cutting machine comprising a bed; a column carried thereby; a guide pivotally mounted upon the column; a ram slidable in the guide; securing bolts adjacent the top and bottom of the guide, passing through the guide and through slots in the column; a nut swiveled to the lower securing bolt, and an adjusting screw mounted in a bearing in the column disposed in the rear of the guide, secured against endwise movement and taking through the swiveled nut.

In testimony whereof I have signed my name to this specification.

FRANK S. JONES.